(12) United States Patent
Lv et al.

(10) Patent No.: US 12,334,702 B2
(45) Date of Patent: Jun. 17, 2025

(54) OPTICAL MODULE AND ERBIUM-DOPED FIBER AMPLIFIER

(71) Applicant: Molex, LLC, Lisle, IL (US)

(72) Inventors: Hai-Feng Lv, Zhuhai (CN); Feng-Qing Zhou, Fremont, CA (US); Gui-Jun Ji, Cupertino, CA (US); Zhong-Sheng Wang, Zhuhai (CN); Da-Xin Chen, Zhuhai (CN)

(73) Assignee: Molex, LLC, Lisle, IL (US)

( * ) Notice: Subject to any disclaimer, the term of this patent is extended or adjusted under 35 U.S.C. 154(b) by 1321 days.

(21) Appl. No.: 16/636,641

(22) PCT Filed: Aug. 10, 2018

(86) PCT No.: PCT/IB2018/056031
§ 371 (c)(1),
(2) Date: Mar. 18, 2021

(87) PCT Pub. No.: WO2019/030713
PCT Pub. Date: Feb. 14, 2019

(65) Prior Publication Data
US 2021/0210922 A1    Jul. 8, 2021

(30) Foreign Application Priority Data
Aug. 11, 2017  (CN) .......................... 201710685457.4

(51) Int. Cl.
*H01S 3/067* (2006.01)
*H01S 3/00* (2006.01)
(Continued)

(52) U.S. Cl.
CPC ........ *H01S 3/06754* (2013.01); *H01S 3/0064* (2013.01); *H01S 3/094003* (2013.01);
(Continued)

(58) Field of Classification Search
CPC ........... H01S 3/06754; H01S 3/094053; H01S 3/094003; H01S 3/10023
See application file for complete search history.

(56) References Cited

U.S. PATENT DOCUMENTS 5,191,467 A   3/1993 Kapany et al.
5,448,579 A   9/1995 Chang et al.
(Continued)

FOREIGN PATENT DOCUMENTS

CN    1419143 A    5/2003
CN    1505767 A    6/2004
(Continued)

OTHER PUBLICATIONS

Peatross et al., "Physics of Light and Optics," p. 79-105, published Aug. 14, 2008. (Year: 2008).*
(Continued)

*Primary Examiner* — Yuqing Xiao
*Assistant Examiner* — Zhengqing Qi (57) ABSTRACT

An optical module includes an optical fiber component, a wavelength division multiplexing (WDM) filter, at least one isolator, a mirror and an optical detecting component. The optical fiber component, the WDM filter, the at least one isolator, the mirror and the optical detecting component are configured to prevent a signal light which is before an EDF component and an amplified signal light after the EDF component from counter transmission with a simplified structure and compact size.

18 Claims, 8 Drawing Sheets

(51) Int. Cl.
*H01S 3/094* (2006.01)
*H01S 3/10* (2006.01)
*H01S 3/13* (2006.01)
*H01S 3/16* (2006.01)

(52) U.S. Cl.
CPC ...... *H01S 3/10023* (2013.01); *H01S 3/13013* (2019.08); *H01S 3/1608* (2013.01); *H01S 3/0071* (2013.01); *H01S 3/094053* (2013.01)

(56) References Cited

U.S. PATENT DOCUMENTS

| | | | |
|---|---|---|---|
| 5,493,440 A * | 2/1996 | Souda | H01S 3/06754 359/341.1 |
| 5,594,821 A | 1/1997 | Cheng | |
| 6,417,962 B1 | 7/2002 | Amin et al. | |
| 6,646,795 B1 | 11/2003 | Jones et al. | |
| 6,826,330 B1 | 11/2004 | Godil et al. | |
| 8,130,799 B2 | 3/2012 | Fermann et al. | |
| 2002/0181100 A1 | 12/2002 | Cao | |
| 2003/0185486 A1 | 10/2003 | Bennett et al. | |
| 2003/0206335 A1 * | 11/2003 | Pan | G02B 6/4209 385/24 |
| 2004/0136056 A1 | 7/2004 | Nagel et al. | |
| 2006/0268405 A1 | 11/2006 | Takeuchi et al. | |
| 2008/0180787 A1 | 7/2008 | DiGiovanni et al. | |
| 2009/0174933 A1 * | 7/2009 | Chang | H01S 3/06754 359/345 |

FOREIGN PATENT DOCUMENTS

| | | |
|---|---|---|
| CN | 201294329 Y | 8/2009 |
| CN | 103885195 A | 6/2014 |
| CN | 203825232 U | 9/2014 |
| CN | 204858262 U | 12/2015 |
| EP | 0723170 A2 | 7/1996 |
| JP | 2003078193 A | 3/2003 |
| WO | 2019/030713 A2 | 2/2019 |

OTHER PUBLICATIONS

International Search report and written opinion received for PCT application No. PCT/IB2018/056031, mailed on Apr. 2, 2019, 9 pages.
Betti et al., "Optical Intersatellite hybrid network links based on WDM technology", 10th Anniversary International Conference on Transparent Optical Networks, vol. 4, 2008, pp. 1-3. (Abstract).
Go et al., "Compact optical module for EDFA", Proceedings of Japan International Electronic Manufacturing Technology Symposium, 1995, pp. 1-2. (Abstract).
Extended European Search Report received for EP Application No. 18844821.1, mailed as on Mar. 18, 2021, 14 Pages.

* cited by examiner

OPTICAL MODULE AND ERBIUM-DOPED FIBER AMPLIFIER

RELATED APPLICATIONS

This application claims priority to International Application No. PCT/IB2018/056031, filed Aug. 10, 2018, which is incorporated herein by reference in its entirety and which further claims priority to Chinese Application No. 201710685457.4, filed Aug. 11, 2017.

TECHNICAL FIELD

The present disclosure relates to an optical module and an erbium-doped fiber amplifier (EDFA), and more particularly, to a compact optical module and an EDFA with simplified structure and compact size.

BACKGROUND

Erbium-doped fiber amplifier (EDFA) is widely employed to amplify optical signals. The EDFA provides for optical-to-optical conversion and avoids OEO (Optical-Electrical-Optical) conversion where received optical signals were converted into electrical signals, retimed, reshaped and regenerated back into optical signals. The EDFA has the advantages of wideband, high signal gain, low noise figure, high output power and low polarization sensitivity. The EDFA includes several optical modules for delivering signal light and pump light, and isolating reverse signal light. The EDFA, however, is still suffered from expensive and complicated optical modules, and have a complex optical fiber fusion process to join several optical modules together. Therefore, an EDFA with simplified structure and compact size optical module is needed.

SUMMARY

One aspect of the present disclosure provides an optical module with simplified structure and compact size.

An optical module for an EDFA for amplifying optical signal according to some embodiments of the present disclosure includes an optical fiber component, a walk-off birefringent crystal, a collimating lens, a first wave plate and a second wave plate, a Faraday rotator, a wavelength division multiplexing (WDM) filter, a mirror and an optical detecting component. The optical fiber component includes a first fiber configured to input a signal light having a first wavelength, a second fiber configured to input a pump light having a second wavelength, a third fiber configured to output the pump light and the signal light together, a fourth fiber configured to input an amplified signal light which amplified from the signal light and a surplus of the pump light output by the third fiber, and a fifth fiber configured to output the amplified signal light. The walk-off birefringent crystal is adjacent to the optical fiber component. The collimating lens is adjacent to the walk-off birefringent crystal and opposite to the optical fiber component. The first wave plate and a second wave plate are between the walk-off birefringent crystal and the collimating lens. The Faraday rotator is adjacent to the collimating lens and opposite to the walk-off birefringent crystal. The WDM filter is provided between the collimating lens and the Faraday rotator, and the WDM filter passes the signal light and the amplified signal light, and reflects the pump light. The mirror is adjacent to the Faraday rotator and opposite to the WDM filter, and the mirror reflects most of the signal light and the amplified signal light. The optical detecting component is adjacent to the mirror and opposite to the Faraday rotator. The optical fiber component, the walk-off birefringent crystal, the first and the second wave plates, the collimating lens, the WDM filter, the Faraday rotator and the mirror are arranged and oriented with respect to each other so that the signal light input from the first fiber and the pump light input from the second fiber are reflected and coupled to the third fiber, the amplified signal light input from the fourth fiber is reflected and coupled to the fifth fiber, and the surplus of the pump light input from the fourth fiber is reflected and dissipated.

In some embodiments, the optical fiber component includes a sleeve configured to accommodate the first fiber, the second fiber, the third fiber, the fourth fiber and the fifth fiber.

In some embodiments, the first wave plate is aligned with the first fiber and the fourth fiber.

In some embodiments, the first wave plate is a 22.5 degree wave plate.

In some embodiments, the Faraday rotator is a 22.5 degree Faraday rotator.

In some embodiments, the second wave plate is aligned with the second fiber.

In some embodiments, the second wave plate is a 45 degree wave plate.

In some embodiments, a reversed signal light from the third fiber is blocked from coupling to the first fiber, and a reversed amplified signal light from the fifth fiber is blocked from coupling to the fourth fiber.

In some embodiments, the WDM filter is a WDM filter film which coated on a surface of the collimating lens.

In some embodiments, the optical module further includes another optical detecting component adjacent to the mirror and opposite to the Faraday rotator and another first wave plate interposed between the walk-off birefringent crystal and the collimating lens, wherein the first wave plate is aligned with the first fiber, and the another first wave plate is aligned with the fourth fiber.

An erbium-doped fiber amplifier (EDFA) according to some embodiments of the present disclosure includes a pump light source, a signal light source, an erbium-doped fiber (EDF) component and an optical module. The pump light source is configured to provide a pump light. The signal light source is configured to provide a signal light. The EDF component is configured to amplify the signal light. The optical module is coupled to the EDF component, the signal light source and the pump light source. The optical module includes an optical fiber component, a walk-off birefringent crystal, a collimating lens, a first wave plate and a second wave plate, a Faraday rotator, a wavelength division multiplexing (WDM) filter, and an optical detecting component. The optical fiber component includes a first fiber configured to input a signal light, a second fiber coupled to the pump light source, a third fiber coupled to an end of the EDF component, a fourth fiber coupled to another end of the EDF component, and a fifth fiber configured to output an amplified signal light. The walk-off birefringent crystal is adjacent to the optical fiber component. The collimating lens is adjacent to the walk-off birefringent crystal and opposite to the optical fiber component. The first wave plate and a second wave plate are between the walk-off birefringent crystal and the collimating lens. The Faraday rotator is adjacent to the collimating lens and opposite to the walk-off birefringent crystal. The WDM filter is between the collimating lens and the Faraday rotator, and the WDM filter passes the signal light and the amplified signal light, and reflects the pump light. The mirror is adjacent to the Faraday rotator and opposite to the WDM filter, and the mirror reflects most of the signal light and the amplified signal light. The optical detecting component is adjacent to the mirror and opposite to the Faraday rotator. The signal light input from the first fiber is reflected and coupled to the third fiber by the mirror, amplified to the amplified signal light by the EDF component and input from the fourth fiber. The pump light input from the second fiber is reflected and coupled to the third fiber by the WDM filter and delivered to the EDF component. The amplified signal light input from the fourth fiber is reflected and coupled to the fifth fiber by the mirror, and the pump light input from the fourth fiber is reflected by the WDM filter and dissipated.

In some embodiments, the first wave plate is aligned with the first fiber and the fourth fiber.

In some embodiments, the first wave plate is a 22.5 degree wave plate for the signal light.

In some embodiments, the Faraday rotator is a 22.5 degree Faraday rotator.

In some embodiments, the second wave plate is aligned with the third fiber.

In some embodiments, the second wave plate is a 45 degree wave plate for the pump light.

In some embodiments, the optical detecting component is configured to provide feedback control for the pump light source.

In some embodiments, a reversed signal light from the third fiber is blocked from coupling to the first fiber, and a reversed amplified signal light from the fifth fiber is blocked from coupling to the fourth fiber.

An optical module for an EDFA for amplifying optical signal according to some embodiments of the present disclosure includes an optical fiber component, a wavelength division multiplexing (WDM) filter, at least one isolator, a mirror and an optical detecting component. The optical fiber component includes a first fiber configured to input a signal light, a second fiber configured to input a pump light, a third fiber configured to output the signal light and the pump light, a fourth fiber configured to input an amplified signal light amplified from the signal light and a surplus of the pump light output by the third fiber, and a fifth fiber configured to output the amplified signal light. The WDM filter is configured to pass the signal light and the amplified signal light, and reflect the pump light. The least one isolator is configured to pass the signal light and the amplified signal light in a forward direction, and isolate the signal light and the amplified signal light in a reverse direction. The mirror is configured to reflect most of the signal light and the amplified signal light. The optical detecting component is configured to monitor a magnitude of the amplified signal light.

In some embodiments, the at least one isolator comprise a walk-off birefringent crystal adjacent to the optical fiber component, a 22.5 degree wave plate and a 22.5 degree Faraday rotator.

The optical module of the present disclosure uses a multiple channel optical fiber component cooperatively with two wave plates to transmit a signal light, an amplified signal light in a forward direction, and to block the signal light and the amplified signal light in a reverse direction. The optical module uses fewer components to provide light delivering and isolation function, and thus helps to reduce size, increase reliability, decrease fiber fusion connections and reduce costs.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes as those of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

Reference numerals are presented as follows
10 optical fiber component
12 sleeve
20 WDM filter
22 WDM filter film
30 isolator
31 walk-off birefringent crystal
32 collimating lens
32S surface
33 first wave plate
34 second wave plate
35 Faraday rotator
40 mirror
50 optical detecting component
52 second optical detecting component
100 EDFA
101 first optical fiber
102 second optical fiber
103 third optical fiber
104 fourth optical fiber
105 fifth optical fiber
110 optical module
120 EDF component
120A end
120B end
130 signal light source 140 pump light source
210 optical module
351 magnetic core
352 garnet
401 lens
402 coating film
501 convex lens
502 photo diode
Las amplified signal light
Las1 reflected amplified signal light
Lp pump light
Lp' surplus pump light
Ls signal light
Ls1 reflected signal light
Ls2 transmitted signal light
Las2 transmitted amplified signal light
Lse extraordinary signal light
Lso ordinary signal light
Lx signal light
Lxe extraordinary signal light
Lxo ordinary signal light
Lpe extraordinary pump light
Lpo ordinary pump light
D1 forward direction
D2 reverse direction
P1 polarization state
P2 polarization state
Pa polarization state
Pb polarization state
Px polarization state
Py polarization state

DETAILED DESCRIPTION

The following description of the disclosure accompanies drawings, which are incorporated in and constitute an optical module and an EDFA of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "some embodiments," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
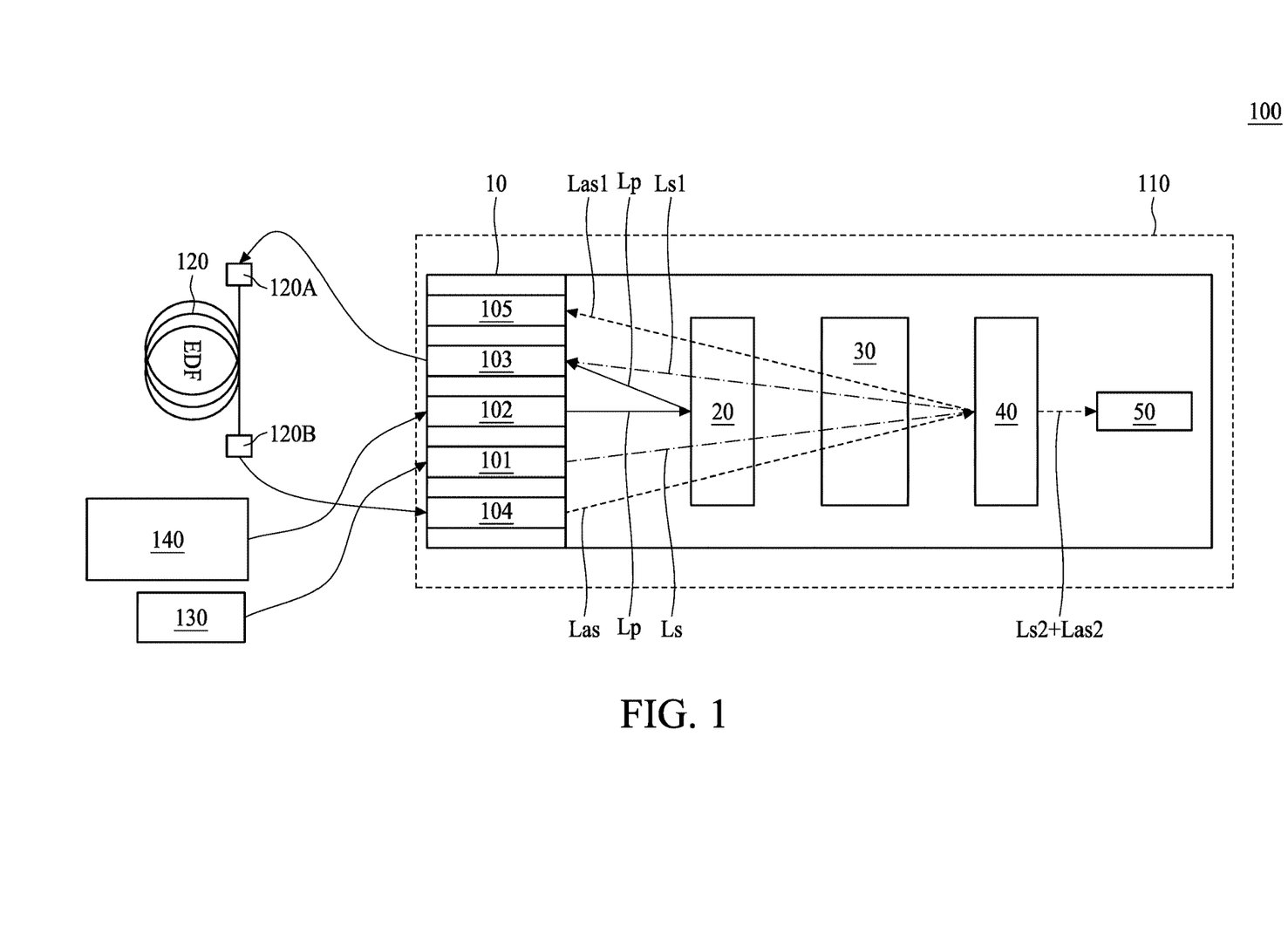
FIG. 1 is a schematic view of an erbium-doped fiber amplifier (EDFA) according to some embodiments of the present disclosure.

FIG. 1 is a schematic view of an erbium-doped fiber amplifier (EDFA) according to some embodiments of the present disclosure. As shown in FIG. 1, the EDFA 100 includes an optical module 110, and an erbium-doped fiber (EDF) component 120 coupled to the optical module 110. In some embodiments, the optical module 110 may be a passive optical module, configured to process light beams for and from the EDF component 120. In some embodiments, the optical module 110 includes an optical fiber component 10, a wavelength division multiplexing (WDM) filter 20, at least one isolator 30, a mirror 40 and an optical detecting component 50. The optical fiber component 10 is a multiple channel optical fiber component. In some embodiments, the optical fiber component 10 includes a first fiber 101, a second fiber 102, a third fiber 103, a fourth fiber 104 and a fifth fiber 105. In some embodiments, the first fiber 101 is coupled to a signal light source 130 configured to provide a signal light Ls having a first wavelength. In some embodiments, the first wavelength of the signal light Ls is, but not limited to, substantially 1550 nm. In some embodiments, the second fiber 102 is coupled to a pump light source 140 configured to provide a pump light Lp having a second wavelength. In some embodiments, the second wavelength of the pump light Lp is, but not limited to, substantially 980 nm. The third fiber 103 is coupled to an end 120A of the EDF component 120. The fourth fiber 104 is coupled to another end 120B of the EDF component 120. The WDM filter 20 is configured to reflect the pump light Lp, and pass the signal light Ls and an amplified signal light Las. The isolator 30 is configured to pass the signal light Ls and the amplified signal light Las moving in a forward direction, and block the signal light Ls and the amplified signal light Las from moving in a reverse direction. The mirror (also referred to as a tap mirror or a tap coupler) 40 is configured to reflect a major portion of the signal light Ls e.g., a reflected signal light Ls1 and a major portion of the amplified signal light Las e.g., a reflected amplified signal light Las1, and to transmit another portion of the signal light Ls e.g., a transmitted signal light Ls2 and another portion of the amplified signal light Las e.g., a transmitted amplified signal light Las2. The optical detecting component 50 is configured to monitor the magnitude of the transmitted signal light Ls2 or the transmitted amplified signal light Las2 which goes through the mirror 40.

In some embodiments, the optical fiber component 10 is arranged in an order of the fourth fiber 104, the first fiber 101, the second fiber 102, the third fiber 103 and the fifth fiber 105, but is not limited thereto. The physical arrangement of the fibers may be modified.

Figure 2:
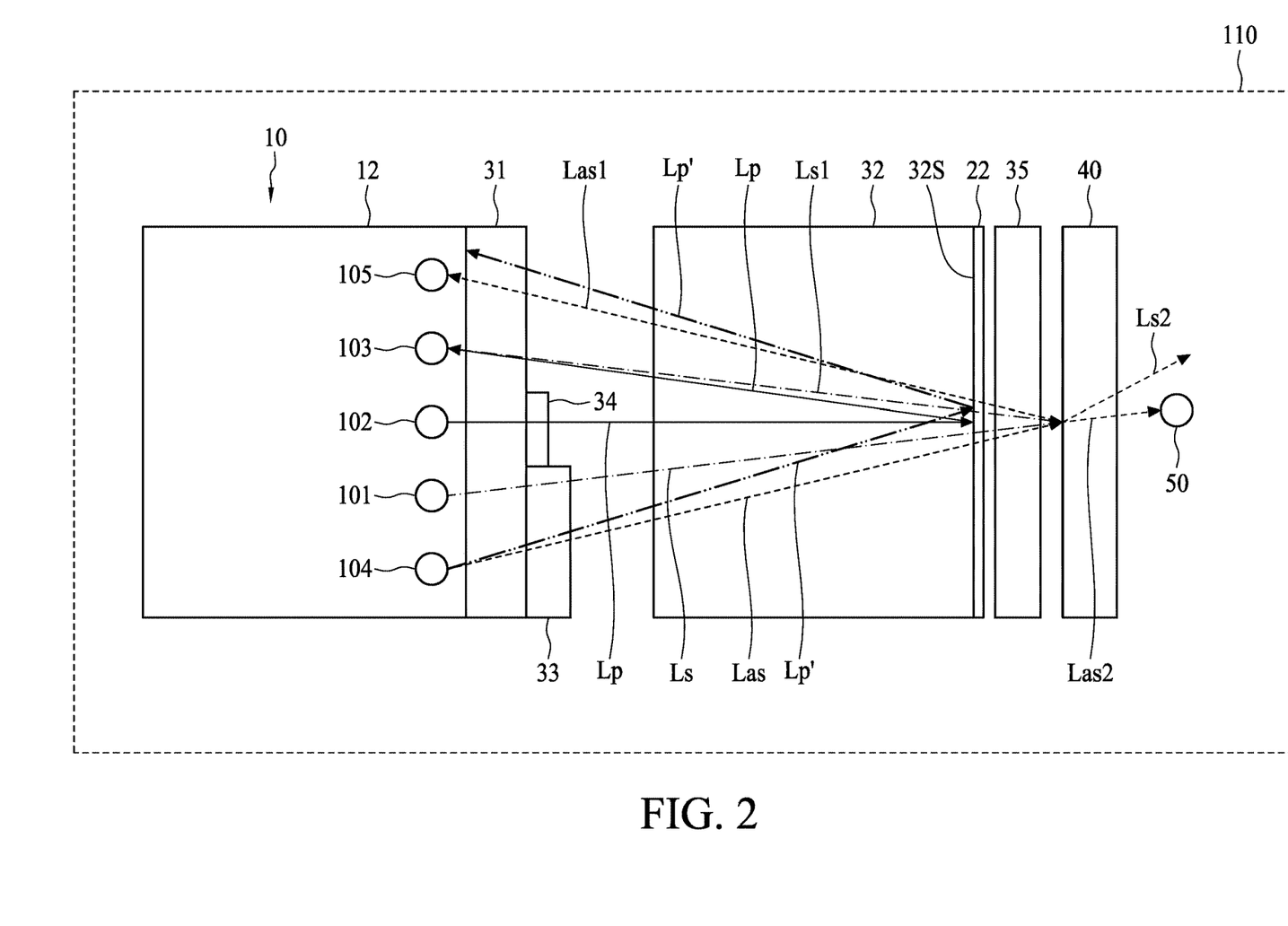
FIG. 2 is a schematic view of an optical module for use in an EDFA according to a first preferred embodiment of the present disclosure.

FIG. 2 is a schematic view of an optical module for use in an EDFA according to a first preferred embodiment of the present disclosure. As shown in FIG. 2, the optical fiber component 10 of the optical module 110 may include a sleeve 12 configured to accommodate and fix the first fiber 101, the second fiber 102, the third fiber 103, the fourth fiber 104 and the fifth fiber 105. In some embodiments, the isolator 30 of the optical module 110 may include a walk-off birefringent crystal 31, a collimating lens 32, a first wave plate 33, a second wave plate 34 and a Faraday rotator 35.

In some embodiments, the walk-off birefringent crystal 31 is disposed adjacent to the optical fiber component 10. The walk-off birefringent crystal 31 is configured to allow the signal light Ls and the amplified signal light Las to travel in the forward direction, but block the signal light Ls and the amplified signal light Las from travel in the reverse direction.

In some embodiments, the collimating lens 32 is disposed adjacent to the walk-off birefringent crystal 31 and opposite to the optical fiber component 10. The collimating lens 32 is configured to collimate and concentrate a light.

In some embodiments, the first wave plate 33 and the second wave plate 34 are interposed between the walk-off birefringent crystal 31 and the collimating lens 32. The first wave plate 33 and the second wave plate 34 are configured to rotate a polarization state of a linear polarized light. In some embodiments, the first wave plate 33 is aligned with the first fiber 101 and the fourth fiber 104, and the second wave plate 34 is aligned with the second fiber 102. In some embodiments, the first wave plate 33 is a 22.5 degree wave plate configured to rotate a polarization state of a linear polarized signal light by 45 degrees, and the second wave plate 34 is a 45 degree wave plate configured to rotate a polarization state of a linear polarized pump light by 90 degrees.

In some embodiments, the Faraday rotator 35 is disposed adjacent to the collimating lens 32 and opposite to the walk-off birefringent crystal 31. The Faraday rotator 35 is configured to rotate a polarization state of a linear polarized signal light.

In some embodiments, the WDM filter 20 of the optical module 110 may be a WDM filter film 22 disposed between the collimating lens 32 and the Faraday rotator 35. The WDM filter film 22 is configured to reflect the pump light Lp, and to pass the signal light Ls and the amplified signal light Las. In some embodiment, the WDM filter film 22 is coated on the collimating lens 32, e.g., on a surface 32S of the collimating lens 32 facing the Faraday rotator 35.

In some embodiments, the mirror 40 of the optical module 110 is disposed adjacent to the Faraday rotator 35 and opposite to the WDM filter film 22. The mirror 40 is configured to partially reflect and partially transmit the signal light Ls or the amplified signal light Las. In some embodiments, the optical detecting component 50 of the optical module 110 is disposed adjacent to the mirror 40 and opposite to the Faraday rotator 35. The optical detecting component 50 is configured to monitor the magnitude of a light e.g., the signal light Ls or the amplified signal light Las.

The operation of the optical module 110 in some embodiments is exemplarily illustrated as follows with reference to FIG. 1 and FIG. 2. The signal light Ls provided by the signal light source 130 is input through the first fiber 101, transmitted through the WDM filter 20 and the isolator 30, and reaching the mirror 40. A most portion of the signal light Ls e.g., a reflected signal light Ls1 is reflected by the mirror 40, transmitted through the isolator 30 and the WDM filter 20, and entering the third fiber 103. Another small portion of the signal light Ls e.g., a transmitted signal light Ls2 is transmitted through the mirror 40. In some embodiments, the transmitted signal light Ls2 would be dissipated (as showed in FIG. 2). In some alternative embodiments, the transmitted signal light Ls2 would be detected by the optical detecting component 50 (as showed in FIG. 6). The pump light Lp is input through the second fiber 102, reflected by the WDM filter 20, and entering the third fiber 103. The reflected signal light Ls1 and the pump light Lp is entering the third fiber 103, and then delivered to the EDF component 120. The EDF component 120 amplifies the intensity of the reflected signal light Ls1 using the energy provided by the pump light Lp, and outputs an amplified signal light Las to the fourth fiber 104. The amplified signal light Las is transmitted through the WDM filter 20 and the isolator 30, and reaching the mirror 40. A major portion of the amplified signal light Las e.g., a reflected amplified signal light Las1 is reflected by the mirror 40, transmitted through the isolator 30 and the WDM filter 20, and entering the fifth fiber 105 for outputting an amplified optical signal. Another small portion of the amplified signal light Las e.g., a transmitted amplified signal light Las2 is transmitted through the mirror 40. In some embodiments, the transmitted amplified signal light Las2 would be monitored by the optical detecting component 50 (as showed in FIG. 2). In some alternative embodiments, the transmitted amplified signal light Las2 would be monitored by another optical detecting component 52 instead (as showed in FIG. 6). In some embodiments, some surplus pump light Lp' may be output from the EDF component 120 to the fourth fiber 104 along with the amplified signal light Las, and the surplus pump light Lp' will be reflected by the WDM filter 20 and dissipated without being coupled. The operation of the EDFA 100 may be monitored by the optical detecting component 50 and may be used to provide feedback control for the power of the pump light source 140 in the EDFA 100, such as for auto power control or auto gain control.

Figure 3A:
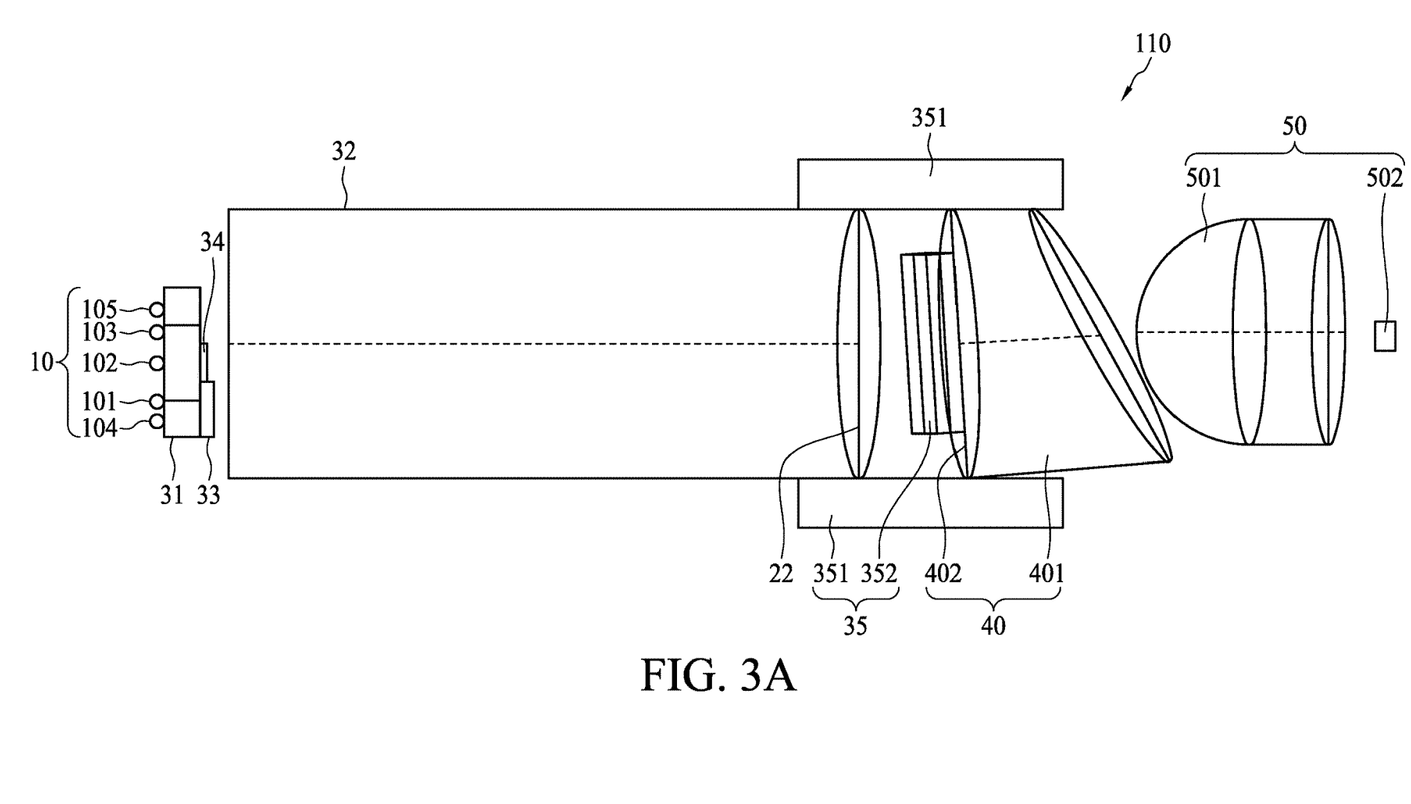
FIG. 3A and FIG. 3B are side views of an optical module viewed at different angles according to the first preferred embodiment of the present disclosure.
Figure 3B:
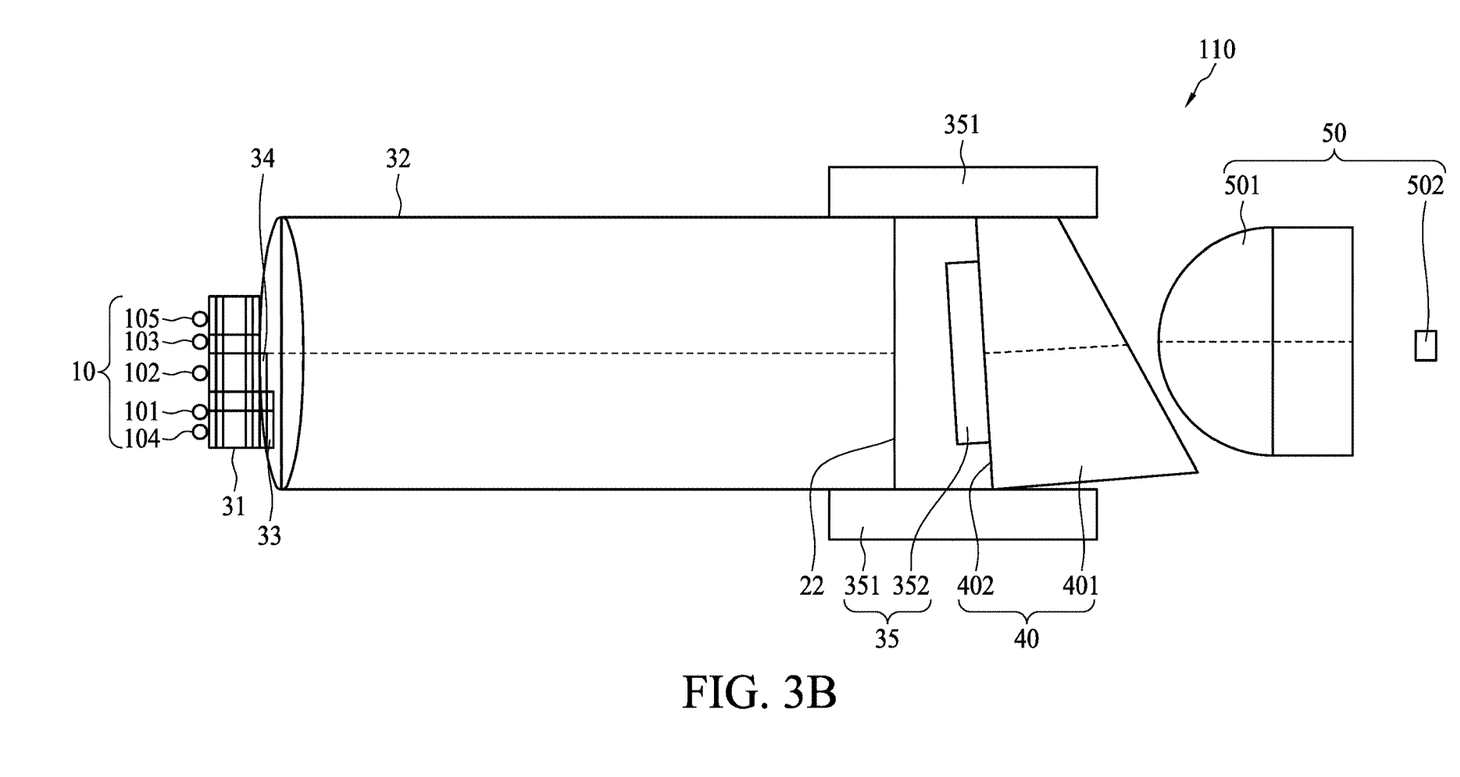

FIG. 3A and FIG. 3B are side views of an optical module viewed at different angles according to a first preferred embodiment of the present disclosure. As shown in FIG. 3A and FIG. 3B, the Faraday rotator 35 of the optical module 110 may include a magnetic core 351 and a garnet 352. In some embodiments, the magnetic core 351 has a ring shape, and the garnet 352 is surrounded by the magnetic core 351. In some embodiments, the garnet 342 is a 22.5 degree garnet configured to rotate a polarization state of a linear polarized signal light by 22.5 degrees. In some embodiments, the mirror 40 includes a lens 401 and a coating film 402 coated on the lens 401, e.g., on a surface of the lens 401 facing the Faraday rotator 35. In some embodiments, the coating film 402 is configured to reflect a major portion of the signal light Ls and the amplified signal light Las, and to transmit a small portion of the signal light Ls and the amplified signal light Las. By way of example, about 95%-99% of the signal light Ls and the amplified signal light Las are reflected by the coating film 402, while about 1%-5% of the signal light Ls and the amplified signal light Las are transmitted through the coating film 402. In some embodiments, the optical detecting component 50 includes a convex lens 501 and a photo diode 502. The amplified signal light Las passing through the coating film 402 may be focused by the convex lens 501, and then detected by the photo diode 502. In some other embodiments, the photo diode 502 can be oriented to monitor the magnitude of the signal light Ls passing through the coating film 402.

Figure 4A:
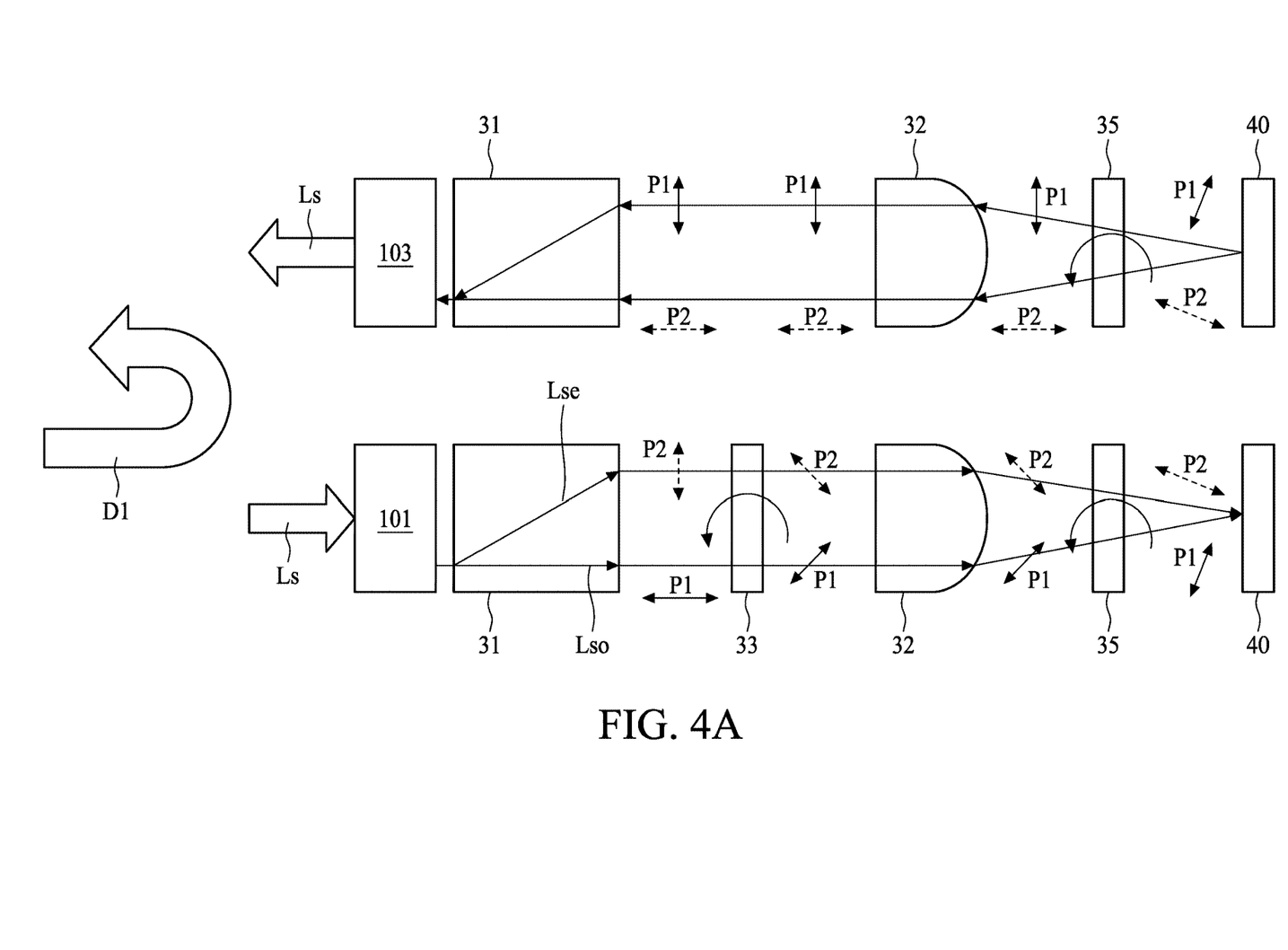
FIG. 4A is a schematic diagram illustrating a reflection light pathway of a signal light in a forward direction according to the first preferred embodiment of the present disclosure.

FIG. 4A is a schematic diagram illustrating a reflection light pathway of a signal light in a forward direction according to the first preferred embodiment of the present disclosure. As shown in FIG. 4A, the signal light Ls is travelling in a forward direction D1 from the first fiber 101 to the third fiber 103. The signal light Ls is separated into two polarized lights such as an ordinary signal light Lso having a polarization state P1 and an extraordinary signal light Lse having a polarization state P2 by the walk-off birefringent crystal 31. The ordinary signal light Lso and the extraordinary signal light Lse are then transmitted through the first wave plate 33, and the polarization state P1 of the ordinary signal light Lso and the polarization state P2 of the extraordinary signal light Lse are then rotated in a direction e.g., the counter-clockwise direction by the first wave plate 33 by about 45 degrees. The ordinary signal light Lso and the extraordinary signal light Lse are then focused by the collimating lens 32, and transmitted through the Faraday rotator 35. After passing through the Faraday rotator 35, the polarization state P1 of the ordinary signal light Lso and the polarization state P2 of the extraordinary signal light Lse are both rotated by about 22.5 degrees in the counter-clockwise direction. The ordinary signal light Lso and the extraordinary signal light Lse are then reflected by the mirror 40, and the position of the ordinary signal light Lso and the position of the extraordinary signal light Lse are upside-down exchanged. The ordinary signal light Lso and the extraordinary signal light Lse are then transmitted through the Faraday rotator 35 again, and the polarization state P1 of the ordinary signal light Lso and the polarization state P2 of the extraordinary signal light Lse are both rotated by about 22.5 degrees in the counter-clockwise direction again. The ordinary signal light Lso and the extraordinary signal light Lse subsequently pass through the collimating lens 32, and enter the walk-off birefringent crystal 31 without passing through the first wave plate 33. Since the polarization state P1 of the ordinary signal light Lso and the polarization state P2 of the extraordinary signal light Lse entering the walk-off birefringent crystal 31 are rotated by 90 degrees and the position of the ordinary signal light Lso and the position of the extraordinary signal light Lse are upside-down exchanged in comparison with that of the ordinary signal light Lso and the extraordinary signal light Lse exiting the walk-off birefringent crystal 31, the ordinary signal light Lso and the extraordinary signal light Lse will be combined and coupled by the walk-off birefringent crystal 31, entering the third fiber 103. It is to be noted that the reflection light pathway of an amplified signal light Las in the forward direction is similar to that of the signal light Ls, i.e., the amplified signal light Las from the fourth fiber 104 is reflected and coupled to the fifth fiber 105, and is not redundantly described.

Figure 4B:
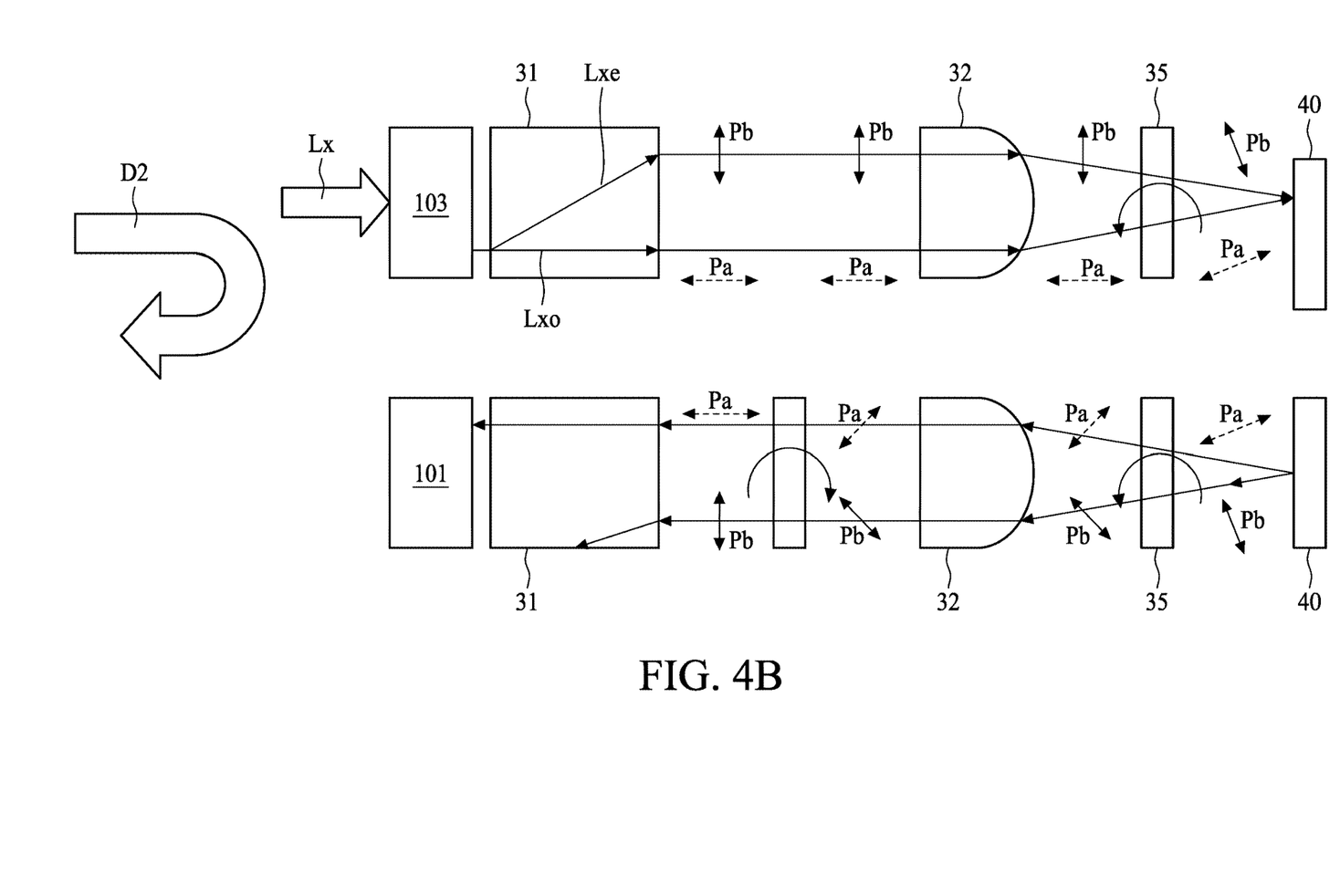
FIG. 4B is a schematic diagram illustrating an isolation light pathway of a signal light in a reverse direction according to the first preferred embodiment of the present disclosure.

FIG. 4B is a schematic diagram illustrating an isolation light pathway of a signal light in a reverse direction according to the preferred embodiment of the present disclosure. As shown in FIG. 4B, another signal light Lx is travelling in a reverse direction D2 from the third fiber 103 to the first fiber 101. The signal light Lx is separated into two polarized lights such as an ordinary signal light Lxo having a polarization state Pa and an extraordinary signal light Lxe having polarization state Pb by the walk-off birefringent crystal 31. The ordinary signal light Lxo and the extraordinary signal light Lxe are then focused by the collimating lens 32 without passing through the first wave plate 33. The ordinary signal light Lxo and the extraordinary signal light Lxe are then transmitted through the Faraday rotator 35, and the polarization state Pa of the ordinary signal light Lxo and the polarization state Pb of the extraordinary signal light Lxe are both rotated by about 22.5 degrees in the counter-clockwise direction. The ordinary signal light Lxo and the extraordinary signal light Lxe are then reflected by the mirror 40, and the position of the ordinary signal light Lxo and the position of the extraordinary signal light Lxe are upside-down exchanged. The ordinary signal light Lxo and the extraordinary signal light Lxe are then transmitted through the Faraday rotator 35 again, and the polarization state Pa of the ordinary signal light Lxo and the polarization state Pb of the extraordinary signal light Lxe are both rotated by about 22.5 degrees in the counter-clockwise direction again. The ordinary signal light Lxo and the extraordinary signal light Lxe subsequently pass through the collimating lens 32, and transmit through the first wave plate 33. After passing through the first wave plate 33, the polarization state Pa of the ordinary signal light Lxo and the polarization state Pb of the extraordinary signal light Lxe are then rotated by about 45 degrees in the clockwise direction. The polarization state Pa of the ordinary signal light Lxo and the polarization state Pb of the extraordinary signal light Lxe entering the walk-off birefringent crystal 31 are as same as that of the ordinary signal light Lxo and the extraordinary signal light Lxe exiting the walk-off birefringent crystal 31 with exchanged upside and downside positions. Accordingly, the ordinary signal light Lxo and the extraordinary signal light Lxe cannot be combined and coupled to first fiber 101, and thus the signal light Lx are blocked from coupling to the first fiber 101. It is to be noted that the isolation light pathway of an amplified signal light in the reverse direction is similar to that of the signal light Ls, i.e., the reverse signal light from the fifth fiber 105 is also blocked from coupling to the fourth fiber 104, and is not redundantly described.

Figure 5:
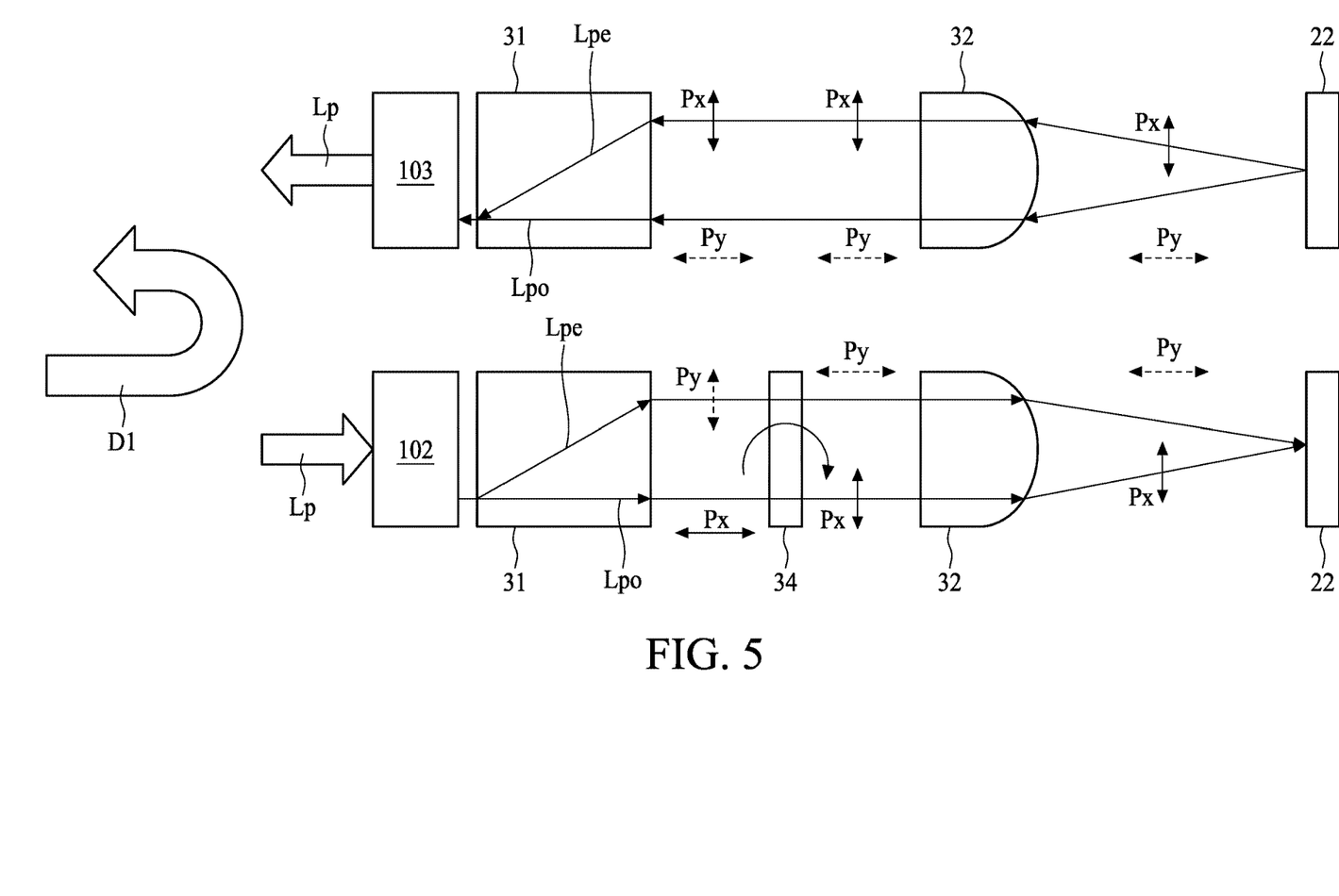
FIG. 5 is a schematic diagram illustrating a reflection light pathway of a pump light in a forward direction according to the first preferred embodiment of the present disclosure.

FIG. 5 is a schematic diagram illustrating a reflection light pathway of a pump light in a forward direction according to a first preferred embodiment of the present disclosure. As shown in FIG. 5, the pump light Lp is travelling in a forward direction D1 from the second fiber 102 to the third fiber 103. The pump light Lp is separated into two polarized lights such as an ordinary pump light Lpo having a polarization state Px and an extraordinary pump light Lpe having a polarization state Py by the walk-off birefringent crystal 31. The ordinary pump light Lpo and the extraordinary pump light Lpe are then transmitted through the second wave plate 34, and the polarization state Px of the ordinary pump light Lpo and the polarization state Py of the extraordinary pump light Lpe are then rotated in a direction e.g., the clockwise direction by the second wave plate 34 by 90 degrees. The ordinary pump light Lpo and the extraordinary pump light Lpe are then focused by the collimating lens 32 and reflected by the WDM filter film 22, and the position of the ordinary pump light Lpo and the position of the extraordinary pump light Lpe are upside-down exchanged. The ordinary pump light Lpo and the extraordinary pump light Lpe then pass through the collimating lens 32, and enter the walk-off birefringent crystal 31 without passing through the second wave plate 34. Since the polarization state Px of the ordinary pump light Lpo and the polarization state Py of the extraordinary pump light Lpe entering the walk-off birefringent crystal 31 are rotated by 90 degrees in comparison with that of the ordinary pump light Lpo and the extraordinary pump light Lpe exiting the walk-off birefringent crystal 31 and exchanged their upside and downside positions, the ordinary pump light Lpo and the extraordinary pump light Lpe will be combined and coupled by the walk-off birefringent crystal 31, and entering the third fiber 103.

Figure 6:
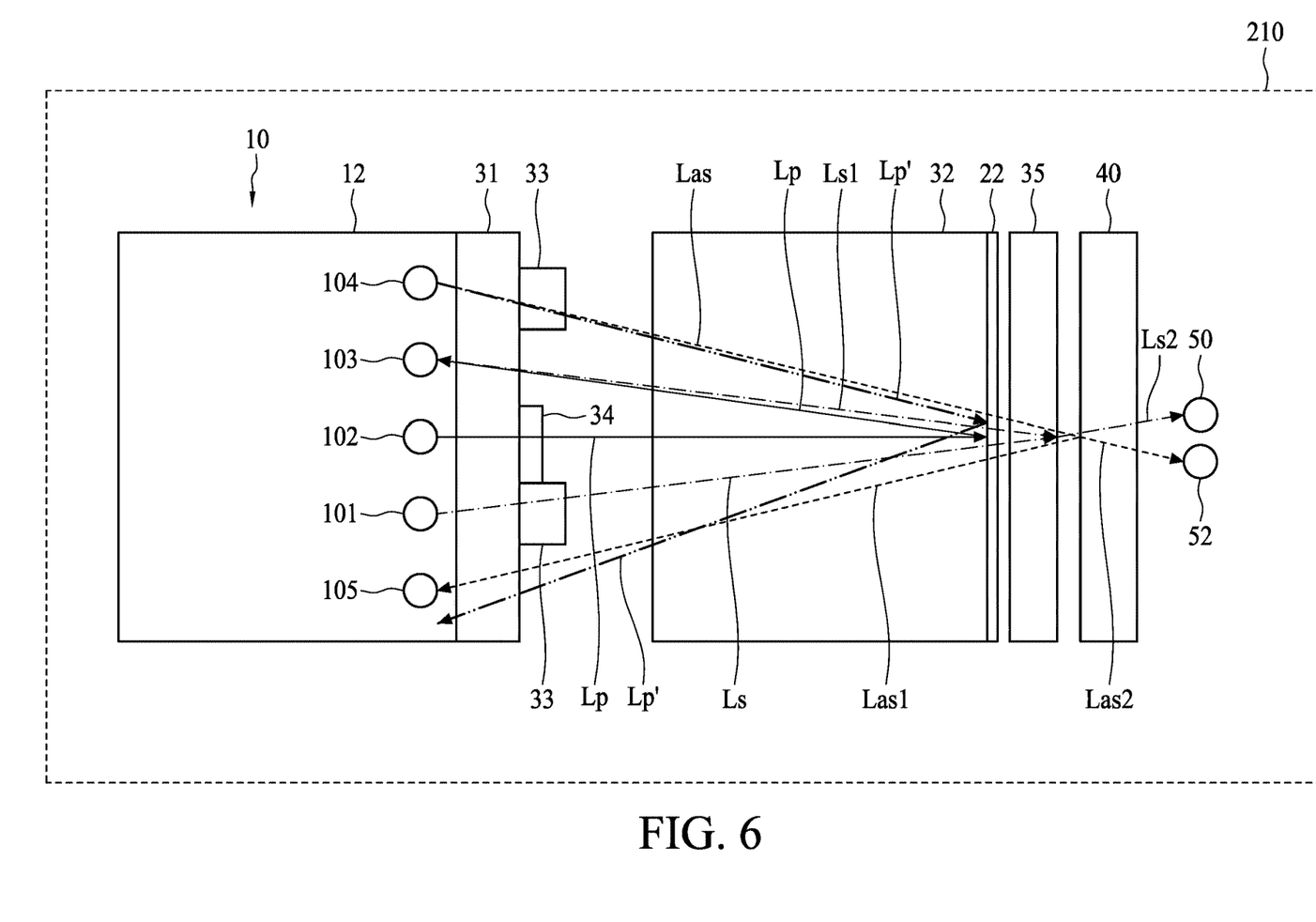
FIG. 6 is a schematic view of an optical module for use in an EDFA according to a second preferred embodiment of the present disclosure.

FIG. 6 is a schematic view of an optical module for use in an EDFA according to the second preferred embodiment of the present disclosure. As shown in FIG. 6, different from the optical module 110 of FIG. 2, the optical fiber component 10 of the optical module 210 may be arranged in an order of the fifth fiber 105, the first fiber 101, the second fiber 102, the third fiber 103 and the fourth fiber 104, but is not limited thereto. Besides, there are two first wave plates 33, wherein one of the first wave plates 33 is aligned with the first fiber 101 and another one of the first wave plates 33 is aligned with the fourth fiber 104. In some embodiments, the optical module 210 may further include a second optical detecting component 52. In some embodiments, the second optical detecting component 52 e.g., a photo diode is disposed adjacent to the mirror 40 and opposite to the Faraday rotator 35. In some embodiments, the second optical detecting component 52 may be disposed adjacent to the optical detecting component 50. The second optical detecting component 52 is configured to monitor the magnitude of an amplified signal light input from the fourth fiber 104, and the optical detecting component 50 is configured to monitor the magnitude of a signal light input from the first fiber 101.

The operation of the optical module 210 in some embodiments is exemplarily illustrated with reference to FIG. 1 and FIG. 6. The signal light Ls is input through the first fiber 101, and transmitted through the walk-off birefringent crystal 31, the first wave plate 33, the collimating lens 32 and the Faraday rotator 35. A major portion of the signal light Ls e.g., a reflected signal light Ls1 is reflected by the mirror 40, reversely transmitted through the Faraday rotator 35, the collimating lens 32 and the walk-off birefringent crystal 31, and entering the third fiber 103. Another portion of the signal light Ls e.g., a transmitted signal light Ls2 is transmitted through the mirror 40, and detected by the optical detecting component 50. The pump light Lp is input through the second fiber 102, transmitted through the walk-off birefringent crystal 31, the second wave plate 34 and the collimating lens 32, reflected by the WDM filter 22, and entering the third fiber 103. The reflected signal light Ls1 and the pump light Lp entering the third fiber 103 are transferred to the EDF 120. Wherein the reflected signal light Ls1 is then amplified as an amplified signal light Las, and input through the fourth fiber 104. The amplified signal light Las is transmitted through the walk-off birefringent crystal 31, the first wave plate 33, the collimating lens 32 and the Faraday rotator 35, and reaching the mirror 40. A portion of the amplified signal light Las e.g., a reflected amplified signal light Las1 is reflected by the mirror 40, reversely transmitted through the Faraday rotator 35, the collimating lens 32 and the walk-off birefringent crystal 31, and entering the fifth fiber 105 for outputting an amplified signal. Another portion of the amplified signal light Las e.g., a transmitted amplified signal light Las2 is transmitted through the mirror 40, and detected by the second optical detecting component 52. In some embodiments, some remaining pump light Lp' may be output from the fourth fiber 104 along with the amplified signal light Las, and the remaining pump light Lp' will be reflected by the WDM filter 22 and dissipated to the environment without being coupled.

In some embodiments, an optical module includes an optical fiber component, a walk-off birefringent crystal, a collimating lens, a first wave plate and a second wave plate, a Faraday rotator, a WDM filter, and an optical detecting component. The optical fiber component, the walk-off birefringent crystal, the first and the second wave plates, the collimating lens, the WDM filter, the Faraday rotator and the mirror are arranged and oriented with respect to each other so that the signal light input from the first fiber and the pump light input from second fiber are reflected and coupled to the third fiber, the amplified signal light input from the fourth fiber is reflected and coupled to the fifth fiber, and a surplus of the pump light input from the fourth fiber is reflected and dissipated.

The optical module of the present disclosure uses five fiber channels integrated with two wave plates to process light for an EDFA. The optical module uses fewer components to provide light delivering and isolation function, and thus helps to reduce EDFA's size, increase reliability, decrease fiber fusion connections and reduce costs.

Although the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. An optical module for an erbium-doped fiber amplifier (EDFA) for amplifying optical signal, comprising:
an optical fiber component, comprising:
a first fiber, configured to input a signal light having a first wavelength;
a second fiber, configured to input a pump light having a second wavelength;
a third fiber, configured to output the pump light and the signal light together;
a fourth fiber, configured to input an amplified signal light which amplified from the signal light and to input a surplus of the pump light output by the third fiber; and
a fifth fiber, configured to output the amplified signal light;
a walk-off birefringent crystal adjacent to the optical fiber component;
a collimating lens adjacent to the walk-off birefringent crystal and opposite to the optical fiber component;
one or more first wave plates and a second wave plate provided between the walk-off birefringent crystal and the collimating lens, wherein the one or more first wave plates are aligned with the first fiber and the fourth fiber;
a Faraday rotator adjacent to the collimating lens and opposite to the walk-off birefringent crystal;
a wavelength division multiplexing (WDM) filter provided between the collimating lens and the Faraday rotator, the WDM filter passing the signal light and the amplified signal light, and reflecting the pump light;
a mirror adjacent to the Faraday rotator and opposite to the WDM filter, the mirror reflecting a major portion of the signal light and the amplified signal light; and
an optical detecting component adjacent to the mirror and opposite to the Faraday rotator;
wherein the optical fiber component, the walk-off birefringent crystal, the one or more first wave plates, the second wave plate, the collimating lens, the WDM filter, the Faraday rotator and the mirror are arranged and oriented with respect to each other so that the signal light input from the first fiber and the pump light input from the second fiber are reflected and coupled to the third fiber, the amplified signal light input from the fourth fiber is reflected and coupled to the fifth fiber, and the surplus of the pump light input from the fourth fiber is reflected by the WDM filter and dissipated to an environment of the EDFA; and
wherein the one or more first wave plates are aligned with the first fiber and the fourth fiber such that the signal light input from the first fiber and the amplified signal light input from the fourth fiber are transmitted through the one or more first wave plates before being reflected.
2. The optical module of claim 1, wherein the optical fiber component comprises a sleeve configured to accommodate the first fiber, the second fiber, the third fiber, the fourth fiber and the fifth fiber.

3. The optical module of claim 1, wherein the one or more first wave plates are 22.5 degree wave plates, which are configured to rotate a polarization state of light by 45 degrees.

4. The optical module of claim 3, wherein the Faraday rotator is a 22.5-degree faraday rotator, which is configured to rotate a polarization state of light by 22.5 degrees.

5. The optical module of claim 1, wherein the second wave plate is aligned with the second fiber.

6. The optical module of claim 5, wherein the second wave plate is a 45 degree wave plate, which is configured to rotate a polarization state of light by 90 degrees.

7. The optical module of claim 1, wherein a reversed signal light from the third fiber is blocked from coupling to the first fiber, and a reversed amplified signal light from the fifth fiber is blocked from coupling to the fourth fiber by the one or more first wave plates.

8. The optical module of claim 1, wherein the WDM filter is a WDM filter film coated on a surface of the collimating lens.

9. The optical module of claim 1, further comprising another optical detecting component adjacent to the mirror and opposite to the Faraday rotator, wherein one of the one or more first wave plates is aligned with the first fiber, and another of the one or more first wave plates is aligned with the fourth fiber.

10. An erbium-doped fiber amplifier (EDFA), comprising:
a pump light source, configured to provide a pump light;
a signal light source, configured to provide a signal light;
an erbium-doped fiber (EDF) component, configured to amplify the signal light; and
an optical module, coupled to the EDF component, the signal light source and the pump light source, the optical module comprising:
an optical fiber component, comprising:
 a first fiber, coupled to the signal light source;
 a second fiber, coupled to the pump light source;
 a third fiber, coupled to an end of the EDF component;
 a fourth fiber, coupled to another end of the EDF component; and
 a fifth fiber, configured to output an amplified signal light;
a walk-off birefringent crystal adjacent to the optical fiber component;
a collimating lens adjacent to the walk-off birefringent crystal and opposite to the optical fiber component;
one or more first wave plates and a second wave plate between the walk-off birefringent crystal and the collimating lens, wherein the one or more first wave plates are aligned with the first fiber and the fourth fiber;
a Faraday rotator adjacent to the collimating lens and opposite to the walk-off birefringent crystal;
a wavelength division multiplexing (WDM) filter between the collimating lens and the Faraday rotator, the WDM filter passing the signal light and the amplified signal light, and reflecting the pump light;
a mirror adjacent to the Faraday rotator and opposite to the WDM filter, the mirror reflecting a major portion of the signal light and the amplified signal light; and
an optical detecting component adjacent to the mirror and opposite to the Faraday rotator;
wherein the signal light input from the first fiber is reflected and coupled to the third fiber by the mirror, amplified to the amplified signal light by the EDF component and output to the fourth fiber, the pump light input from the second fiber is reflected and coupled to the third fiber by the WDM filter and delivered to the EDF component, the amplified signal light input from the fourth fiber is reflected and coupled to the fifth fiber by the mirror, and a surplus of the pump light input from the fourth fiber is reflected by the WDM filter and dissipated to an environment of the EDFA; and
wherein the one or more first wave plates are aligned with the first fiber and the fourth fiber such that the signal light input from the fiber and the amplified signal light input from the fourth fiber are transmitted through the one or more first wave plates before being reflected.

11. The EDFA of claim 10, wherein the one or more first wave plates are 22.5 degree wave plates, which are configured to rotate a polarization state of light by 45 degrees.

12. The EDFA of claim 11, wherein the Faraday rotator is a 22.5 degree faraday rotator, which is configured to rotate a polarization state of light by 22.5 degrees.

13. The EDFA of claim 10, wherein the second wave plate is aligned with the second fiber.

14. The EDFA of claim 13, wherein the second wave plate is a 45 degree wave plate, which is configured to rotate a polarization state of light by 90 degrees.

15. The EDFA of claim 10, wherein the optical detecting component is configured to provide a feedback control for the pump light source.

16. The EDFA of claim 10, wherein a reversed signal light from the third fiber is blocked from coupling to the first fiber, and a reversed amplified signal light from the fifth fiber is blocked from coupling to the fourth fiber by the one or more first wave plates.

17. An optical module for an erbium-doped fiber amplifier (EDFA) for amplifying optical signal, comprising:
an optical fiber component, comprising:
 a first fiber, configured to input a signal light;
 a second fiber, configured to input a pump light;
 a third fiber, configured to output the signal light and the pump light;
 a fourth fiber, configured to input an amplified signal light which amplified from the signal light and to input a surplus of the pump light output by the third fiber; and
 a fifth fiber, configured to output the amplified signal light;
a wavelength division multiplexing (WDM) filter, configured to pass the signal light and the amplified signal light, and reflect the pump light;
at least one isolator, configured to pass the signal light and the amplified signal light in a forward direction, and isolate the signal light and the amplified signal light in a reverse direction, the at least one isolator includes a walk-off birefringent crystal, a collimating lens, one or more first wave plates, a second wave plate, and a Faraday rotator;
a mirror, configured to reflect a major portion of the signal light and the amplified signal light; and
an optical detecting component, configured to monitor a magnitude of the amplified signal light,
wherein the one or more first wave plates are aligned with the first fiber and the fourth fiber such that the signal light input by the first fiber and the amplified signal light input from the fourth fiber are transmitted through the one or more first wave plates in the forward direction.

18. The optical module of claim 17, wherein the walk-off birefringent crystal is adjacent to the optical fiber component, the one or more first wave plates are 22.5 degree wave plates, and the Faraday rotator is a 22.5 degree faraday rotator configured to rotate a polarization state of light by 22.5 degrees.

\* \* \* \* \*